United States Patent
Tsumori et al.

(10) Patent No.: US 9,133,422 B2
(45) Date of Patent: Sep. 15, 2015

(54) SULFONIC GROUP-CONTAINING, MALEIC ACID-BASED, WATER-SOLUBLE COPOLYMER AQUEOUS SOLUTION AND POWDER OBTAINED BY DRYING THE AQUEOUS SOLUTION

(75) Inventors: Takahiro Tsumori, Hyogo (JP); Masato Nakano, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 89 days.

(21) Appl. No.: 12/863,865

(22) PCT Filed: Mar. 27, 2009

(86) PCT No.: PCT/JP2009/057004
§ 371 (c)(1),
(2), (4) Date: Jul. 21, 2010

(87) PCT Pub. No.: WO2009/123324
PCT Pub. Date: Oct. 8, 2009

(65) Prior Publication Data
US 2010/0292122 A1 Nov. 18, 2010

(30) Foreign Application Priority Data
Mar. 31, 2008 (JP) .................. 2008-091377

(51) Int. Cl.
| | | |
|---|---|---|
| C11D 7/26 | (2006.01) | |
| C11D 7/34 | (2006.01) | |
| C11D 7/54 | (2006.01) | |
| C11D 3/20 | (2006.01) | |
| C11D 3/34 | (2006.01) | |
| C11D 3/39 | (2006.01) | |
| C11D 3/37 | (2006.01) | |
| C08J 3/14 | (2006.01) | |
| C08L 33/00 | (2006.01) | |
| C08L 35/00 | (2006.01) | |
| C11D 3/33 | (2006.01) | |
| C08L 33/14 | (2006.01) | |
| C08L 41/00 | (2006.01) | |

(52) U.S. Cl.
CPC .............. C11D 3/2086 (2013.01); C08J 3/14 (2013.01); C08L 33/00 (2013.01); C08L 35/00 (2013.01); C11D 3/33 (2013.01); C11D 3/34 (2013.01); C11D 3/378 (2013.01); C11D 3/3757 (2013.01); C11D 3/3902 (2013.01); C11D 3/3942 (2013.01); C11D 3/3947 (2013.01); C11D 7/265 (2013.01); C11D 7/34 (2013.01); C08L 33/14 (2013.01); C08L 41/00 (2013.01)

(58) Field of Classification Search
CPC ...... C11D 3/34; C11D 3/3902; C11D 3/3942; C11D 3/3947; C11D 3/3757; C11D 7/265; C11D 7/343

USPC .......... 562/590, 595; 510/477, 488, 492, 499, 510/475, 372
See application file for complete search history.

(56) References Cited

U.S. PATENT DOCUMENTS

| | | |
|---|---|---|
| 4,774,303 A | 9/1988 | Denzinger et al. |
| 4,862,930 A | 9/1989 | Sauerbruch |
| 5,055,540 A | 10/1991 | Hughes et al. |
| 5,175,361 A | 12/1992 | Denzinger et al. |
| 5,223,590 A | 6/1993 | Hughes et al. |
| 5,733,857 A | 3/1998 | Yamaguchi et al. |
| 5,993,666 A | 11/1999 | Yamaguchi et al. |
| 6,777,385 B2 | 8/2004 | Hemmi et al. |
| 7,709,052 B2 | 5/2010 | Dyllick-Brenzinger et al. |
| 2002/0019329 A1 | 2/2002 | Hemmi et al. |
| 2006/0009571 A1 | 1/2006 | Dyllick-Brenzinger et al. |

FOREIGN PATENT DOCUMENTS

| | | |
|---|---|---|
| CA | 2038332 A1 | 9/1991 |
| CN | 1112787 A | 11/1995 |

(Continued)

OTHER PUBLICATIONS

International Search Report for Appl. No. PCT/JP2009/057004 dated Jun. 16, 2009.

(Continued)

Primary Examiner — Gregory R Delcotto
(74) Attorney, Agent, or Firm — Pearne & Gordon LLP

(57) ABSTRACT

Provided is a copolymer aqueous solution which exerts a high calcium carbonate-deposition suppressing ability even under high hardness condition, has excellent storage stability, and suppresses coloring of a detergent to yellow even when used as a detergent raw material. The water-soluble copolymer aqueous solution includes a water-soluble copolymer and hydrogen peroxide as essential components, in which: the water-soluble copolymer at least includes, as its structure, a structural unit originating from a monoethylenic unsaturated dicarboxylic acid (or dicarboxylate) monomer having 4 to 6 carbon atoms or its anhydride (a) at 30 to 60 mol %, a structural unit originating from a monoethylenic unsaturated monocarboxylic acid (or monocarboxylate) monomer having 3 to 8 carbon atoms (b), and a structural unit originating from a monoethylenic unsaturated monomer having a sulfonic (or sulfonate) group (c); the water-soluble copolymer has a weight average molecular weight of 1,000 or more and 50,000 or less; the water-soluble copolymer aqueous solution has a weight ratio of the hydrogen peroxide of 10 ppm to 50,000 ppm with respect to a solid content of the water-soluble copolymer aqueous solution; and the water-soluble copolymer aqueous solution has a weight ratio of water of 33% to 99%.

2 Claims, No Drawings

(56) References Cited

FOREIGN PATENT DOCUMENTS

| | | |
|---|---|---|
| EP | 2000485 A1 | 12/2008 |
| JP | 62-270605 A | 11/1987 |
| JP | 03-002167 B2 | 1/1991 |
| JP | 03-014046 B2 | 2/1991 |
| JP | 03-124711 A | 5/1991 |
| JP | 03-234713 A | 10/1991 |
| JP | 05-239114 A | 9/1993 |
| JP | 05-247143 A | 9/1993 |
| JP | 2574144 B2 | 10/1996 |
| JP | 2000-355615 A | 12/2000 |
| JP | 2002-080502 A | 3/2002 |
| WO | 2004/037867 A1 | 5/2004 |
| WO | 2004/085496 A1 | 10/2004 |

OTHER PUBLICATIONS

Chinese Office action in corresponding Chinese patent application No. 200980105570.4; Aug. 17, 2012.

SULFONIC GROUP-CONTAINING, MALEIC ACID-BASED, WATER-SOLUBLE COPOLYMER AQUEOUS SOLUTION AND POWDER OBTAINED BY DRYING THE AQUEOUS SOLUTION

TECHNICAL FIELD

The present invention relates to a maleic acid-based, water-soluble copolymer containing a sulfonic (or sulfonate) group, an aqueous solution of the copolymer, and a powder obtained by drying the aqueous solution.

BACKGROUND ART

Many acrylic acid-based polymers having carboxyl groups, maleic acid/acrylic acid-based copolymers, and the like have been conventionally known to have a calcium ion-capturing ability, a clay-dispersing ability, and the like, and hence have been widely used in detergent compositions, inorganic pigment dispersants, agglomerate reagents, scale inhibitors, chelating agents, fiber treatment agents, and the like.

As a method of producing the acrylic acid-based polymer, there are disclosed JP 62-270605 A, JP 05-239114 A, and the like. In addition, as a method of producing the maleic acid/acrylic acid-based copolymer, there are disclosed various documents such as JP 05-247143 A, JP 03-2167 B, JP 03-14046 B, and JP 2574144 B, and thus improvements of the above abilities have been attempted.

However, while having extremely high calcium ion-capturing ability, the maleic acid/acrylic acid-based copolymer hardly exerts the effect of the clay-dispersing ability, in particular, under the condition where the water hardness is high. This is because, in particular the maleic acid-based polymer deteriorates remarkably in antigelation properties (hard resistance, that is, water-solubility of the polymer in the presence of a hardness component) when a content of a structural unit originating from a maleic acid increases. There is not so large problem in the case of soft water having low hardness such as water in Japan, but worldwide, use of the copolymer causes a big problem in regions where water has extremely high hardness, such as United States of America and China.

In addition, the acrylic acid-based polymer exerts the clay-dispersing ability to some degree due to the absence of a structural unit originating from a maleic acid, but it is difficult to say that the acrylic acid-based polymer has sufficient calcium ion-capturing ability.

Further, as a detergent additive, disclosed is a water-soluble copolymer including: a structural unit originating from a monoethylenic unsaturated dicarboxylic acid (or dicarboxylate) monomer having 4 to 6 carbon atoms or its anhydride (a) at 30 to 60 mol %; a structural unit originating from a monoethylenic unsaturated monocarboxylic acid (or monocarboxylate) monomer having 3 to 8 carbon atoms (b); and a structural unit originating from a monoethylenic unsaturated monomer having a sulfonic (or sulfonate) group (c) (for example, refer to JP 2000-355615 A and JP 03-234713 A). There is disclosed that the water-soluble copolymer, compared to the maleic acid/acrylic acid-based copolymer or the acrylic acid-based polymer, exerts favorable calcium ion-capturing ability, the clay-dispersing ability, and a calcium carbonate deposition-suppressing ability under high hardness. However, the water-soluble copolymer has a problem that a detergent is colored yellow when used as a powdery additive for detergent.

DISCLOSURE OF THE INVENTION

Problems to be Solved by the Invention

In view of the above current situation, an object of the present invention is to provide a copolymer aqueous solution capable of exerting high calcium carbonate deposition-suppressing ability even under high hardness condition, and suppressing coloring of a powdery agent to yellow even when used as a powdery agent raw material such as a powdery detergent raw material.

Means for Solving the Problems

The copolymer aqueous solution of the present invention provides a water-soluble copolymer aqueous solution including a water-soluble copolymer and hydrogen peroxide as essential components, in which:

the water-soluble copolymer at least includes, as its structure, a structural unit originating from a monoethylenic unsaturated dicarboxylic acid (or dicarboxylate) monomer having 4 to 6 carbon atoms or its anhydride (a) at 30 to 60 mol %, a structural unit originating from a monoethylenic unsaturated monocarboxylic acid (or monocarboxylate) monomer having 3 to 8 carbon atoms (b), and a structural unit originating from a monoethylenic unsaturated monomer having a sulfonic (or sulfonate) group (c);

the water-soluble copolymer has a weight average molecular weight of 1,000 or more and 50,000 or less;

the water-soluble copolymer aqueous solution has a weight ratio of the hydrogen peroxide of 10 ppm to 50,000 ppm with respect to a solid content of the water-soluble copolymer aqueous solution; and the water-soluble copolymer aqueous solution has a weight ratio of water of 33% to 99%.

In a preferred embodiment of the present invention, 50 to 100 mol % of the structural unit originating from a monoethylenic unsaturated dicarboxylic acid (or dicarboxylate) monomer having 4 to 6 carbon atoms or its anhydride (a) is a structural unit originating from maleic acid.

In a preferred embodiment of the present invention, the structural unit originating from a monoethylenic unsaturated monomer having a sulfonic (or sulfonate) group (c) is a structural unit originating from 3-allyloxy-2-hydroxy-1-propanesulfonic acid.

According to another aspect of the present invention, a method of producing a water-soluble copolymer is provided. In the method of producing a water-soluble copolymer, the water-soluble copolymer at least includes, as its structure, a structural unit originating from a monoethylenic unsaturated dicarboxylic acid (or dicarboxylate) monomer having 4 to 6 carbon atoms or its anhydride (a) at 30 to 60 mol %, a structural unit originating from a monoethylenic unsaturated monocarboxylic acid (or monocarboxylate) monomer having 3 to 8 carbon atoms (b), and a structural unit originating from a monoethylenic unsaturated monomer having a sulfonic (or sulfonate) group (c), and having a weight average molecular weight of 1,000 or more and 50,000 or less, the method of producing a water-soluble copolymer includes a neutralizing step, wherein a content of hydrogen peroxide at the end of the neutralizing step adjusts to 10 ppm or more and 50,000 ppm or less with respect to a solid content of a water-soluble copolymer aqueous solution.

According to still another aspect of the present invention, a powder including a water-soluble copolymer is provided. The powder is obtained by drying the water-soluble copolymer aqueous solution of the present invention.

In a preferred embodiment of the present invention, the powder is a detergent.

According to still another aspect of the present invention, an agent for suppressing calcium carbonate deposition is provided. The agent for suppressing calcium carbonate deposition includes the powder of the present invention.

Effect of the Invention

According to the present invention, the copolymer aqueous solution which exerts high calcium carbonate deposition-suppressing ability even under high hardness condition, has excellent storage stability, and inhibits coloring of a powdery agent to yellow even when used as a powdery agent raw material such as a powdery detergent raw material. According to the present invention, the powder including a water-soluble copolymer which exerts high calcium carbonate deposition-suppressing ability even under high hardness condition, has excellent storage stability, and inhibits coloring of a powdery agent to yellow even when used as a powdery agent raw material such as a powdery detergent raw material.

BEST MODE FOR CARRYING OUT THE INVENTION

Hereinafter, the water-soluble copolymer aqueous solution, the powder including the water-soluble copolymer, and the calcium carbonate deposition-suppressing agent of the present invention are described in detail.

<<Water-Soluble Copolymer>>

The water-soluble copolymer aqueous solution of the present invention includes a water-soluble copolymer as an essential component. The water-soluble copolymer as an essential component of the present invention at least includes, as its structure, a structural unit originating from a monoethylenic unsaturated dicarboxylic acid (or dicarboxylate) monomer having 4 to 6 carbon atoms or its anhydride (a) at 30 to 60 mol %, a structural unit originating from a monoethylenic unsaturated monocarboxylic acid (or monocarboxylate) monomer having 3 to 8 carbon atoms (b), and a structural unit originating from a monoethylenic unsaturated monomer having a sulfonic (or sulfonate) group (c). The water-soluble copolymer has a weight average molecular weight of 1,000 or more and 50,000 or less.

Hereinafter, respective components are described in detail in each item.

<Monomers>

Examples of the monoethylenic unsaturated dicarboxylic acid (or dicarboxylate) having 4 to 6 carbon atoms as the monomer (a) include maleic acid, itaconic acid, mesaconic acid, fumaric acid, and citraconic acid and their salts, and their anhydrides if the acid can have an anhydrous form. Those may be used alone or in combination as a mixture. In addition, derivatives of those exemplified compounds can be used to such an extent that characteristics of the water-soluble copolymer of the present invention are not impaired and a polymerization reaction of the present invention is not inhibited. Maleic acid (or a maleate), or maleic anhydride is particularly preferred.

In addition, the term "-ate" as used in the present invention refers to, for example, a salt of an alkali metal such as sodium or potassium, a salt of an alkaline earth metal such as calcium or magnesium, an ammonium salt, or an organic amine salt such as monoethanolamine or triethanolamine. Those may be used alone or in combination as a mixture. A salt of an alkali metal such as sodium or potassium is preferred, and a sodium salt is particularly preferred. Hereinafter, those are each denoted simply as "-ate" in the present invention.

Examples of the monoethylenic unsaturated monocarboxylic acid (or monocarboxylate) having 3 to 8 carbon atoms as the monomer (b) include acrylic acid, methacrylic acid, crotonic acid, isocrotonic acid, and α-hydroxyacrylic acid, and salts of those acids. Those may be used alone or in combination as a mixture. In addition, derivatives of those exemplified compounds can be used to such an extent that characteristics of the water-soluble copolymer of the present invention are not impaired and the polymerization reaction of the present invention is not inhibited. Acrylic acid and methacrylic acid, and salts of the acids are particularly preferred.

Examples of the monoethylenic unsaturated monomer having a sulfonic (or sulfonate) group as the monomer (c) include 3-allyloxy-2-hydroxy-1-propanesulfonic acid, vinyl sulfonic acid, allyl sulfonic acid, methallyl sulfonic acid, styrene sulfonic acid, 2-acrylamide-2-methyl propanesulfonic acid, sulfoethyl acrylate, sulfoethyl methacrylate, sulfopropyl acrylate, sulfopropyl methacrylate, and 2-hydroxy-3-butenesulfonic acid, and salts thereof. Those may be used alone or in combination as a mixture. Preferred are 3-allyloxy-2-hydroxy-1-propanesulfonic acid, 2-acrylamide-2-methyl propanesulfonic acid, sulfoethyl acrylate, sulfoethyl methacrylate, 2-hydroxy-3-butenesulfonic acid, and salts thereof. Particularly preferred is 3-allyloxy-2-hydroxy-1-propanesulfonic acid and its salt, because the calcium carbonate deposition-suppressing ability of the water-soluble copolymer aqueous solution or the powder containing the water-soluble copolymer becomes high. In addition, because stability with time of a copolymer to be obtained is high, 3-allyloxy-2-hydroxy-1-propanesulfonic acid and its salt is preferred as a monoethylenic unsaturated monomer having a sulfonic (or sulfonate) group.

The water-soluble copolymer as an essential component of the water-soluble copolymer aqueous solution of the present invention may include a structure originating from another monomer (referred to as monomer (d)) in addition to the structure originating from the above monomers (a) to (c). The monomer (d) is not particularly limited and may be one of water-soluble and water-insoluble monomers as long as the monomer (d) is a monoethylenic unsaturated monomer copolymerizable with the monomers (a) to (c) and the monomer (d) does not impair water-solubility of the obtained copolymer.

<Composition Ratio of Copolymer>

A composition ratio of those monomers (a) to (d) in the copolymer of the present invention is, at a molar ratio, (a)/(b)/(c)/(d)=30 to 70/30 to 70/2 to 16/0 to 5 and preferably 40 to 60/40 to 60/5 to 16/0 to 5 and the total is 100 mol %.

The monomer (a) is a monomer having a dicarboxylic acid and contributes to improving the calcium ion-capturing ability to a large extent, but adversely effects on the antigelation ability. Accordingly, it is not preferred that the content of the monomer (a) be less than 30 mol % because sufficient calcium ion-capturing ability cannot be obtained. In addition, it is not preferred that the content exceed 70 mol % because the antigelation ability deteriorates remarkably and hence the clay-dispersing ability in water having high hardness remarkably impairs.

The monomer (b) is a monomer having a monocarboxylic acid and effective to improve the clay-dispersing ability in water having high hardness but not very effective to improve the calcium ion-capturing ability. Accordingly, it is not preferred that the content of the monomer (b) exceed 70 mol % because sufficient calcium ion-capturing ability may not be obtained. In addition, it is not preferred that the content be less than 30 mol % because the clay-dispersing ability may deteriorate.

The monomer (c) is a monomer having a sulfonic group and does not contribute to improving the calcium ion-capturing ability at all, and on the contrary, the reduction in the calcium ion-capturing ability is caused in accordance with the content of the monomer (c). However, the monomer (c) contributes to improving the antigelation ability to extremely large extent, to thereby provide significant improvement of the clay-dispersing ability in water having high hardness. Accordingly, it is not preferred that a monomer (c) content be less than 2 mol % because sufficient antigelation ability cannot be obtained. In addition, it is not preferred that the monomer (c) content exceed 16 mol % because significant deterioration of the calcium ion-capturing ability is caused and yellow color in a powdery agent becomes strong when the water-soluble copolymer is used as a powdery agent raw material such as a powdery detergent raw material.

As the monomer (d), a hydrophobic monomer, a monomer having a hydroxyl group, or the like is used, as required, in an amount of 5 mol % or less according to the purpose. It is not preferred that the content of the monomer (d) exceed 5 mol % because high calcium ion-capturing ability, the clay-dispersing ability in water having high hardness, and high antigelation ability, which are the objects of the present invention, may be deteriorated.

<Weight Average Molecular Weight of Copolymer>

The weight average molecular weight of the copolymer of the present invention is 1,000 to 50,000 and more preferably 5,000 to 15,000. In general, when copolymers have the same compositions one from another and weight average molecular weights of more than 1,000, it is known that the calcium ion-capturing ability is apt to be high with increase in the weight average molecular weight, while the clay-dispersing ability in water having high hardness is apt to be high with decrease in the weight average molecular weight (that is, the weight average molecular weight approaches to 1,000).

It is not preferred that the copolymer of the present invention have the weight average molecular weight of less than 1,000 because the calcium ion-capturing ability may deteriorate. In addition, it is also not preferred that the weight average molecular weight exceed 50,000, because the clay-dispersing ability in water having high hardness may deteriorate remarkably.

<Physical Properties of Copolymer>

Further, the copolymer of the present invention has preferably the calcium ion-capturing ability of 0.25 or more, the clay-dispersing ability in water having high hardness of 0.35 or more, and the antigelation ability of 0.35 or more, and more preferably the calcium ion-capturing ability of 0.28 or more, the clay-dispersing ability of 0.40 or more, and the antigelation ability of 0.40 or more. The copolymer has still more preferably the calcium ion-capturing ability of 0.30 or more. The copolymer has still more preferably the clay-dispersing ability in water having high hardness of 0.45 or more, still more preferably 0.55 or more, still more preferably 0.57 or more, and most preferably 0.61 or more. On the other hand, the copolymer has still more preferably the antigelation property (represented as antigelation ability in tables) of 0.5 or more, still more preferably 0.7 or more, and still more preferably 0.9 or more. In addition, the water-soluble copolymer of the present invention has favorable balance among three physical properties in an extremely preferred embodiment. The water-soluble copolymer preferably satisfy those physical properties, because favorable effects can be obtained when the water-soluble copolymer is used in the water-soluble copolymer aqueous solution and a powder containing the water-soluble copolymer of the present invention are used in a detergent composition, an inorganic pigment dispersant, a water treatment agent, or a fiber treatment agent.

Note that preferred values for the calcium ion-capturing ability, the clay-dispersing ability, and the antigelation ability in the present invention are values measured by the following methods.

(Calcium Ion-Capturing Ability)

(1) First, as a calcium ion standard liquid for a calibration curve, each 50 g of a 0.01 mol/l, 0.001 mol/l, or 0.0001 mol/l aqueous solution of calcium chloride dihydrate was prepared. pH of each aqueous solution was adjusted to the range of 9 to 11 with a 4.8% aqueous solution of NaOH. Further, 1 ml of a 4 mol/l aqueous solution of potassium chloride (hereinafter, abbreviated as 4M-KCl aqueous solution) was added to the obtained aqueous solution, and the resultant was stirred sufficiently using a magnetic stirrer, whereby a sample liquid for a calibration curve was prepared. In addition, as a calcium ion standard liquid for a test, a 0.0012 mol/l aqueous solution of calcium chloride dihydrate in a required amount (50 g of the aqueous solution was used for one sample) was prepared as well.

(2) Next, 10 mg of a test sample (polymer) in terms of a solid content was weighed in a 100-cc beaker. 50 g of the calcium ion standard liquid for a test prepared in the item (1) were added into the beaker, and the mixture was stirred sufficiently using a magnetic stirrer. Further, pH of the aqueous solution was adjusted to the range of 9 to 11 with a 4.8% aqueous solution of NaOH and 1 ml of a 4M-KCl aqueous solution was added to the obtained mixture in the same manner as in the sample liquid for a calibration curve, whereby a sample liquid for a test was prepared.

(3) The thus obtained sample liquid for a calibration curve and a sample liquid for a test were analyzed by measurement with ION ANALYZER EA 920 manufactured by ORION RESEARCH INC. and a calcium ion electrode 93-20 manufactured by ORION RESEARCH INC.

(4) From measured values of the sample liquid for a calibration curve and the sample liquid for a test, the calcium ion amounts that the samples (polymer) capture were determined by calculation. The obtained values were converted to grams of a captured amount per 1 g of the polymer solid content in terms of calcium carbonate. The resultant values were defined as values for calcium ion-capturing ability.

(Clay-Dispersing Ability)

(1) First, 600 g of a glycine buffer were prepared by adding ion-exchanged water to 67.56 g of glycine, 52.6 g of sodium chloride, and 60 ml of a 1-mol/L aqueous solution of NaOH.

(2) 0.817 g of calcium chloride dihydrate was added to 60 g of the liquid prepared in the item (1), and pure water was added to the mixture, whereby 1,000 g of a dispersion were prepared. In addition, a 0.1% aqueous solution of a polymer in terms of a solid content was prepared.

(3) 0.3 g of clay composed of 11 kinds of JIS test powders I (Kanto loam, particulate, the Association of Powder Process Industry and Engineering, JAPAN) was loaded into a general test tube having a volume of about 30 cc to be used in an experiment, and 27 g of the dispersion prepared in the item (2) and 3 g of the 0.1% aqueous solution of the polymer in terms of a solid content were added to the test tube. In this case, the calcium concentration of a test liquid is 500 ppm in terms of calcium carbonate.

(4) After having been hermetically sealed with a parafilm, the test tube was lightly shaken in such a manner that the clay was dispersed in the entirety of the mixture, and was then further shaken vertically 20 times. After the test tube had been left at rest out of direct sunlight for 6 hours, 5 ml of the supernatant of the dispersion were collected with a whole pipette.

(5) The absorbance (ABS) of a 1-cm cell containing the liquid for light having a wavelength of 380 nm was measured with a UV spectrophotometer (manufactured by Shimadzu Corporation, UV-1200), and the value was defined as a clay-dispersing ability under water having high hardness.

(Antigelation Ability)

(1) First, a 0.1 mol/l calcium ion standard liquid was prepared using calcium chloride dihydrate. The obtained liquid was added into a tank equipped with Byurette Head H-900 as an attachment unit of an automatic titrator manufactured by Hiranuma Sangyo Corporation., and set together with Byurette B-900. In addition, 1% polymer aqueous solution was prepared separately.

(2) 80 g of pure water, 1 cc of the glycine buffer solution used in the measurement of the clay-dispersing ability, and 2.5 g of the 1% polymer aqueous solution were added into a 100-cc beaker, and the resultant was stirred sufficiently.

(3) By using Automatic Titrator COM-550 manufactured by Hiranuma Sangyo Corporation and using a photometric titration unit M-500, the attachment unit, for the measurement, the calcium ion standard liquid was dropped to the sample liquid from B-900 set in the above item (1) up to 10 ml by 0.05 ml, and turbidity of the sample liquid was measured with the wavelength of 530 nm. A dropped amount at a final point, that is, the point at which the solution becomes cloudy was determined based on an F intersection detection method described in an instruction manual of the titrator.

(4) A value for the antigelation ability was obtained by multiplying the dropped amount at the final point obtained as described above by one tenth.

<<Method of Producing Copolymer>>

A method of producing a water-soluble copolymer as an essential component of the water-soluble copolymer aqueous solution and a powder containing the water-soluble copolymer of the present invention is not particularly limited and preferably includes polymerization in an aqueous solvent in the presence of a radical polymerization initiator by using a chain transfer agent according to cases. As the radical polymerization initiator, hydrogen peroxide, a persulfate, or both of them in combination is particularly preferably used.

Hereinafter, each condition is described in detail.

<Solvent>

The solvent that can be used in the production method of the copolymer of the present invention is not particularly limited and is preferably an aqueous solvent, preferably a solvent containing 80 weight % or more of water, and particularly preferably water. In order to improve the solubility of monomers to be used in the polymerization to the solvent, an organic solvent may be appropriately added to the solvent, as required, to such an extent that the polymerization is not adversely affected.

Specific examples of the organic solvent include: lower alcohols such as methanol, ethanol, and isopropylalcohol; lower ketones such as acetone, methyl ethyl ketone, and diethyl ketone; ethers such as dimethyl ether, diethyl ether, and dioxane; and amides such as dimethylformaldehyde. Those may be used alone and may be used in combination as a mixture.

<Methods of Adding Monomers>

Methods of adding the monomers in the production method for the copolymer of the present invention are described sequentially.

The monomer (a) is added in the amount of 50 weight % or more, preferably 80 weight % or more, and particularly preferably total amount as an initially loaded amount with respect to the total use amount of the monomer (a). It is not preferred that the initially loaded amount be less than 50 weight % because the amount of the unreacted products in the latter half of the polymerization increases and the monomer (a) in the copolymer is not introduced uniformly, resulting in deterioration of the calcium ion-capturing ability and the antigelation ability of the copolymer to be obtained. Note that neutralization degree is described later.

The monomer (b) is added to a reaction system in the amount of 70 weight % or more, preferably 90 weight % or more, and particularly preferably total amount with respect to the total use amount of the monomer (b) by substantially continuous dropping. It is not preferred that the dropping ratio be less than 70 weight % (that is, the initially loaded amount be 30 weight % or more) because block polymerization of the monomer (b) occur at the initial polymerization and the copolymer may have high molecular weight, resulting in adverse effects on all the calcium ion-capturing ability, the clay-dispersing ability in water having high hardness, and the antigelation ability. The dropping time of the monomer (b) is 30 to 240 minutes, preferably 60 to 180 minutes, and particularly preferably 90 to 150 minutes. When the dropping time is shorter than 30 minutes, block polymerization of the monomer (b) occurs and when the dropping time exceed 240 minutes, block polymerization of the monomer (a) occurs. Accordingly, both cases adversely affect the calcium ion-capturing ability, the clay-dispersing ability in water having high hardness, and the antigelation ability, therefore, the both cases are not preferred. Note that neutralization degree is described below.

Methods of adding the monomer (c) and the monomer (d) are not particularly limited. A ratio between the initially loaded amount of each monomer and the amount in which the monomer is dropped, and, when the monomer is dropped, the dropping time may be appropriately set in view of the reactivity of the monomer. Neutralization degree is described below.

<Neutralization Degree of Monomer>

The neutralization degree of the monomer is 50 to 100 mol % and preferably 50 to 95 mol % with respect to the total amount of the monomers (a) to (d) at the stage before the polymerization initiator is loaded. It is not preferred that the neutralization degree be less than 50 mol % or exceed 100 mol % because introduction efficiency of the monomer (a) impairs, resulting in deteriorations of the calcium ion-capturing ability and the antigelation ability of the copolymer to be obtained. Examples of the neutralizer for the monomer include: hydroxides of alkali metals such as sodium hydroxide and potassium hydroxide; hydroxides of alkaline earth metals such as calcium hydroxide and magnesium hydroxide; ammonia; and organic amine salts such as monoethanolamine and triethanolamine. Those may be used alone or in combination as a mixture. Hydroxides of alkali metals such as sodium hydroxide and potassium hydroxide are preferred, and sodium hydroxide is particularly preferred. Hereinafter, those are simply denoted as "neutralizer".

A neutralization degree during the polymerization (that is, during the dropping of a monomer) is not particularly limited and can be set to any appropriate neutralization degree as long as the neutralization degree is within the range for a polymerization pH to be described later. The neutralization degree may be appropriately set with a neutralizer in view of the reactivity of the monomer.

<Polymerization Initiator>

The polymerization initiator in the production method for the copolymer of the present invention is not particularly limited. The polymerization is preferably performed by using a radical polymerization initiator. Hydrogen peroxide, a persulfate, or both of them in combination is particularly preferably used. A chain transfer agent and a polyvalent metal ion as a promoter for the decomposition of each of the initiators may be used. Hereinafter, the initiator is described specifically.

(Radical Polymerization Initiator)

Examples of the radical polymerization initiator include: persulfates such as ammonium persulfate, potassium persulfate, and sodium persulfate; azo-based compounds such as 2,2'-azobis(2-amidinopropane)hydrochloride, 4,4'-azobis-4-cyanovaleric acid, azobisisobutylonitrile, 2,2'-azobis(4-methoxy-2,4-dimethyl valeronitrile); organic peroxides such as benzoyl peroxide, lauroyl peroxide, peracetic acid, di-t-butylperoxide, and cumene hydroperoxide; and hydrogen peroxide. Those may be used alone or in combination as required. In addition, persulfates such as ammonium persulfate, potassium persulfate, and sodium persulfate, hydrogen peroxide, and combination of those compounds are particularly preferred. The water-soluble copolymer aqueous solution of the present invention includes hydrogen peroxide as an essential component. Accordingly, use of hydrogen peroxide as an initiator or a chain transfer agent is preferred because hydrogen peroxide contributes to simplification of production process and reduction in production cost. Combination of a persulfate and hydrogen peroxide is most preferred from the aspect of the polymerization.

The use amount of the radical polymerization initiator is 2 g to 10 g and preferably 3 g to 8 g in total per 1 mol of a monomer. It is not preferred that the use amount be less than 2 g because the residual amount of the monomer significantly increases. In addition, it is not also preferred that the use amount exceed 10 g, from the following reasons: no addition effect of the initiator is not found anymore; the use amount is economically disadvantageous; and purity content of the obtained copolymer reduces in accordance with an excess amount of the initiator, resulting in deterioration of physical properties such as the calcium ion-capturing ability.

The method of adding a radical polymerization initiator is not particularly limited. However, in view of its decomposition property, the amount in which the radical polymerization initiator is dropped substantially continuously is preferably 50 weight % or more of the required predetermined amount, particularly preferably 80 weight % or more, and most preferably total amount with respect to total use amount of the radical polymerization initiator.

The dropping time is not particularly limited and preferably set appropriately as desired because the dropping time affects on the molecular weight and the molecular weight distribution of the polymer to be obtained. The initiators, which are decomposed relatively quickly, such as persulfates, e.g., ammonium persulfate, potassium persulfate, and sodium persulfate, is preferably dropped until the time when dropping of the monomers is terminated, and the dropping of the initiator is preferably terminated in 30 minutes after the dropping of the monomers is terminated, and particularly preferably in 5 to 20 minutes after the dropping of the monomers is terminated. From the foregoing, there can be found such an effect that the residual amount of the monomers in the copolymer can be remarkably reduced. Note that even when the dropping of the initiator terminates before dropping of the monomers is terminated, the polymerization is not adversely affected. Then, the dropping time of the initiator may be set according to the residual amount of the monomers in the obtained copolymer.

The time when dropping of the initiator is initiated is not limited and may be set appropriately. For example, dropping of the initiator may be initiated before dropping of the monomers is initiated according to cases. Alternatively, in particular when two or more of initiators are used in combination, dropping of one initiator is initiated, and after a predetermined lapse of time or termination of the dropping, dropping of another initiator may be initiated. The time when dropping of the initiator is initiated may be set appropriately according to the decomposition rate of the initiator and reactivity of the monomers.

(Chain Transfer Agent)

A chain transfer agent may be used as a molecular weight modifier for the copolymer as required in combination with the radical polymerization initiator to such an extent that the polymerization is not adversely affected. Examples of the chain transfer agent include, but not particularly limited to, a sulfite, a bisulfite, and a hypophosphite. Those may be used alone or in combination.

The use amount of the chain transfer agent is preferably as twice or less the amount of the initiator at weight ratio. It is not preferred that the amount of the chain transfer agent exceed twice the amount of the initiator because no addition effect is found any more and decrease in purity content of the copolymer is caused. In addition, a method of adding a chain transfer agent, and dropping time in the case where the chain transfer agent is dropped are not particularly limited and may be set appropriately according to cases.

(Polyvalent Metal Ion)

Further, according to cases, a polyvalent metal ion may be used as a promoter for the decomposition of the radical polymerization initiator as required in combination with the initiator. An effective polyvalent metal ion that can be used is, for example, $Fe^{2+}$, $Fe^{3+}$, $Cu^{2+}$, $Cu^{+}$, $V^{2+}$, $V^{3+}$, or $VO^{2+}$. Those may be used alone or in combination. Although the water-soluble copolymer aqueous solution of the present invention is characterized by including hydrogen peroxide, addition of the polyvalent metal ion causes decomposition of the hydrogen peroxide. Accordingly, it is not preferred to add the polyvalent metal ion from the reason that more hydrogen peroxide has to be added in order to obtain the effects of the present invention.

When the polyvalent metal ion is added, a method of adding the polyvalent metal ion is not particularly limited. The polyvalent ion is preferably added before dropping of the monomers is terminated and particularly preferably the total amount of the polyvalent metal ion is loaded in the initial stage. In addition, the use amount is preferably 100 ppm or less with respect to the total amount of the reaction liquid. It is not preferred that the use amount exceed 100 ppm because no addition effect is found any more and the obtained copolymer is colored considerably and hence the copolymer may not be used as a detergent composition.

When the polyvalent metal ion is added, supplying form of the polyvalent metal ion is not particularly limited and any metal compounds and metals can be used as long as they are ionized in a polymer reaction system. Examples of the metal compound and metal include: water-soluble metal salts such as vanadium oxytrichloride, vanadium trichloride, vanadium oxalate, vanadium sulfate, vanadic acid anhydride, ammonium methavanadate, ammonium hypovanadus sulfate [$(NH_4)_2SO_4 \cdot VSO_4 \cdot 6H_2O$], ammonium vanadus sulfate [$(NH_4)V(SO_4)_2 \cdot 12H_2O$], copper (II) acetate, copper (II) bromide, copper (II) acetyl acetate, cupric chloride, ammonium copper chloride, copper carbonate, copper (II) chloride, cupric (II) citrate, copper(II) formate, copper (II) hydroxide, copper nitrate, copper napthenate, copper (II) oleate, copper maleate, copper phosphate, copper (II) sulfate, cuprous chloride, copper (I) cyanide, copper iodide, copper (I) oxide, copper thiocyanate, iron acetylacetate, ammonium iron citrate, ferric ammonium oxalate, ferrous ammonium sulfate, ferric ammonium sulfate, iron citrate, iron fumarate, iron maleate, ferrous lactate, ferric nitrate, iron pentacarbonyl, ferric phosphate, ferric pyrophosphate; metal oxides such as vanadium pentoxide, copper (II) oxide, ferrous oxide, and ferric oxide; metallic sulfide such as copper (II) sulfate and iron sulfate; copper powder; and iron powder. The monomer composition for polymerization of the present invention includes additives such as the above monomer, a polymerization initiator, a chain transfer agent, and a polyvalent metal ion. Note that another additive other than the exemplified additives may be included in the monomer composition to such an extent that the polymerization reaction of the present invention is not inhibited and physical properties of the obtained water-soluble copolymer are not inhibited.

<Other Polymerization Conditions>

Other polymerization conditions in the production method for the copolymer of the present invention are pH, temperature, concentration, and pressure upon the polymerization. Those conditions are described in detail sequentially.

(pH Upon Polymerization)

The pH upon the polymerization at the time when the initial loading is terminated (that is, immediately before the initiation of the dropping of a monomer to be added by dropping, or, when the dropping of the polymerization initiator is initiated before the dropping of the monomer, immediately before the initiation of the dropping of the polymerization initiator) is 5 to 13, preferably 5 to 12, and more preferably 8 to 12. After that, according to the initiation of the dropping of the monomer, the polymerization is initiated, and the following setting is preferably performed: the pH gradually reduces with the progress of the polymerization. The pH of the reactants is preferably adjusted to 4 to 8 at the time when the dropping of the monomers is terminated.

In general, the polymerizability of the monomer (a) is extremely worse as compared to that of the monomer (b). Accordingly, the monomer (a) is added in a large amount in the stage of initial loading. In that case, however, the concentration of the monomer (a) is overwhelmingly larger as compared to that of the monomer (b) in the early stage of the polymerization, so the block polymerization of the monomer (a) may occur. In view of the foregoing, in the production method of the present invention, the inventors of the present invention have considered that the pH must be adjusted with a view to controlling the polymerizability of the monomer (a), so the pH is set within the above range. The monomer (a) is a monomer having a dicarboxylic acid, and the possible types of the monomer are classified into the following three types: a type in which both carboxyl groups are acidic, a type in which one of the groups is acidic, and a type in which both the groups are neutral. Of those, the type in which one of the groups is acidic, that is, a semi-neutral type is most rich in polymerizability, so the polymerizability of the monomer (a) can be controlled by controlling the abundance of the molecules of the monomer (a) of the semi-neutral type. That is, in the early stage of the polymerization, the amount of the molecules of the semi-neutral type must be increased because the polymerizability of the monomer (a) also reduces as the abundance of the molecules of the semi-neutral type is suppressed to some extent, and the polymerization progresses so that the concentration of the monomer (a) itself reduces. The inventors have arrived at the above setting of the pH in consideration of those findings.

Note that the "neutralizer" described in the section titled "Methods of adding monomers" has only to be appropriately used as a pH adjustor as required. Note that the final pH has only to be set to a desired pH by appropriately using the "neutralizer" after termination of the polymerization as required.

(Polymerization Temperature)

A temperature upon the polymerization is not particularly limited at the initial loading. The temperature is preferably 80° C. or higher, more preferably 90° C. or higher, particularly preferably near the boiling point of a polymerization solvent, and still more preferably the boiling point of the polymerization solvent during a time period from the initiation of the polymerization caused by the initiation of the dropping of the monomer or polymerization initiator to the termination of the polymerization (or to the termination of the aging when an additional time period for which the resultant copolymer is aged is set after the termination of the polymerization (termination of the dropping of all components including the monomers, the polymerization initiators)). When pH and the concentration are adjusted after termination of the polymerization, the temperature is not particularly limited and may be set appropriately.

It is not preferred that the temperature upon the polymerization be lower than 80° C. because decomposition efficiency of the polymerization initiator deteriorate and residual amount of the monomers in the copolymer to be obtained increases. In addition, polymerization at the boiling point is extremely preferred because temperature control becomes extremely easy and hence good reproducibility of the polymerization and extremely stable quality of the copolymer to be obtained can be obtained.

(Polymerization Concentration)

The concentration of each monomer upon the polymerization of the monomer composition for polymerization reaction is not particularly limited. The concentration at the initial loading is 35 to 75 weight %, preferably 40 to 70 weight %, and particularly preferably 45 to 60 weight %. It is not preferred that the concentration of each monomer at the initial loading be less than 35 weight % in view of productivity and because reactivity of the monomer (a) extremely deteriorates. It is not preferred that the concentration exceed 75 weight % because no water-solubility of the monomers is found anymore and a slurry-like product or a precipitant is generated in the reaction liquid, resulting in non-uniform polymerization.

In addition, the solid content concentration of the polymer at the termination of polymerization is 35 to 65 weight %, preferably 40 to 60 weight %, and particularly preferably 45 to 60 weight %. The concentration of a dropping product (that is, each monomer) is adjusted so that the concentration corresponds to the above range. The solid content concentration of the polymer of less than 35 weight % at the termination of polymerization results in extreme decrease in the solid content concentration of the polymer. Thus, the concentration of the polymer of less than 35 weight % is not preferred from the viewpoint of economical efficiency because polymerizability of the monomers extremely deteriorates and hence residual amounts of the monomers in the copolymer to be obtained extremely increases, and productivity lowers. On the contrary, the solid content concentration of the polymer of more than 65 weight % is not preferred because the concentration results in extreme increase in the solid content concentration of the polymer, thus, the reaction solution has extremely high viscosity, uniform polymerization cannot be obtained, the polymer may have extreme high molecular weight, and in particular, the clay dispersing ability in water having high hardness is adversely affected. Further, the solution viscosity of the copolymer to be obtained becomes extremely high, so the concentration of the polymer of more than 65 weight % is extremely not preferred also in view of handling. Note that the solid content concentration of the polymer after the polymerization may be adjusted appropriately.

(Polymerization Pressure)

The pressure upon the polymerization is not particularly limited. The polymerization may be performed under any one of increased pressure, normal pressure (atmospheric pressure), and reduced pressure. The pressure may be set appropriately according to cases.

(Polymerization Facility)

The water-soluble copolymer aqueous solution of the present invention includes hydrogen peroxide as an essential component. Therefore, use of hydrogen peroxide as a initiator or a chain transfer agent contributes to simplification of production processes and reduction in production cost. In this time, however, the presence of a metal ion in the polymer system induces decomposition of the hydrogen peroxide. When the metal ion remains in the polymerization solution, decomposition of the hydrogen peroxide may proceed with time even if the hydrogen peroxide is added after the metal ion is added, whereby it is necessary to add extra hydrogen peroxide. Accordingly, the polymerization facility, in particular a polymerization furnace is preferably subjected to processing in such a manner that the metal ion does not elute. Specific examples of the material of the facility include SUS316 and a metal subjected to glass lining treatment such as a stainless subjected to glass lining treatment.

(Concentration of Hydrogen Peroxide During Polymerization)

The weight ratio of the hydrogen peroxide during the polymerization is preferably set to 10 ppm or more with respect to the solid content of the polymerization solution because color tone of the copolymer after drying is improved.

In a preferred production method for the water-soluble copolymer aqueous solution in this application, the content of the hydrogen peroxide in the polymerization solution when dropping of all monomers and initiators to a reactor is terminated (at termination of the polymerization) is set to 10 ppm or more and 50,000 ppm or less at weight ratio with respect to the solid content of the polymerization solution (water-soluble copolymer aqueous solution). By producing the water-soluble copolymer aqueous solution as described above, the color tone of the copolymer after drying is improved. In addition, stability of viscosity of the water-soluble copolymer aqueous solution with time is improved.

When the production steps of the water-soluble copolymer includes the aging step as described below (step of continuing heating and incubation in a reactor (polymerization furnace) after the polymerization) or a neutralizing step, the content of the hydrogen peroxide at the time when the aging step or the neutralizing step is terminated (at the time the polymerization solution is removed from a reactor subjected to aging treatment or neutralizing treatment) is set to 10 ppm or more and 50,000 ppm or less with respect to a solid content of the polymerization solution (water-soluble copolymer aqueous solution). By producing the water-soluble copolymer aqueous solution as described above, the color tone of the copolymer after drying is improved. In addition, viscosity stability of the water-soluble copolymer aqueous solution with time is improved.

The content of the hydrogen peroxide after termination of the polymerization step or after termination of the aging step or termination of the neutralizing step is preferably 25 ppm or more and 20,000 ppm or less, more preferably 50 ppm or more and 10,000 ppm or less, and most preferably 100 ppm or more and 5,000 ppm or less at weight ratio with respect to the solid content of the polymerization solution (water-soluble copolymer aqueous solution). Note that it is preferred that the content of the hydrogen peroxide is adjusted in the above range at the time of the last step among the polymerization step, the aging step, and the neutralizing step.

(Aging/Neutralizing Step)

An aging step or a neutralizing step may be provided as required at the time when the polymerization is terminated. The aging step is preferably provided because the residual monomer amount can be reduced by the aging step. Because the amount of the hydrogen peroxide in the reaction liquid (polymerization liquid, polymerization solution) remarkably reduces during the aging step or the neutralizing step, addition amount and addition time are preferably provided so that the content of the hydrogen peroxide does not become 10 ppm or less with respect to the solid content of the polymerization solution. It is not preferred that the content of the hydrogen peroxide be 10 ppm or less with respect to the solid content of the polymerization solution during the aging step or the neutralizing step because the polymerization liquid is colored. In a preferred method, hydrogen peroxide is added during the aging step or the neutralizing step so that the content of the hydrogen peroxide is kept at 10 ppm or more and 50,000 ppm or less with respect to the content of the water-soluble copolymer.

In the aging step, the aging time is appropriately determined. That is, when the aging time is lengthened, the residual monomer amount can be reduced, and the rate at which the residual monomer amount is reduced with longer aging time, so production efficiency lowers. Accordingly, the aging time is determined by balance between acceptable residual monomer amount and production efficiency.

<<Composition of Water-Soluble Copolymer Aqueous Solution (Also Referred to as Water-Soluble Copolymer Composition)>>

The water-soluble copolymer aqueous solution of the present invention includes hydrogen peroxide as an essential component. The water-soluble copolymer aqueous solution includes hydrogen peroxide, so the water-soluble copolymer aqueous solution is excellent in storage stability and, when the water-soluble copolymer aqueous solution is used as a detergent raw material, the detergent is prevented from being colored yellow.

The composition ratio (content) of the hydrogen peroxide in the water-soluble copolymer aqueous solution of the present invention is 10 ppm to 50,000 ppm at weight ratio with respect to the solid content of the water-soluble copolymer aqueous solution. The phrase "at weight ratio" in the present invention means that the composition ratio of the hydrogen peroxide is represented by the following formula: composition ratio of hydrogen peroxide with respect to the solid content of water-soluble copolymer aqueous solution (%)=weight of hydrogen peroxide/weight of solid content of water-soluble copolymer aqueous solution×100; or similarly, composition ratio of hydrogen peroxide with respect to solid content of water-soluble copolymer aqueous solution (ppm) =weight of hydrogen peroxide/weight of solid content of water-soluble copolymer aqueous solution×100×10,000.

The weight of the solid content of the water-soluble copolymer aqueous solution herein includes weight of water-soluble copolymer, residual monomer, initiator residue, and the like. In the present invention, the solid content of the water-soluble copolymer aqueous solution is a value measured by the method in the section <Measurement of solid content (solid content concentration) of copolymer aqueous solution> described below. When the composition ratio of the hydrogen peroxide with respect to the solid content is less than 10 ppm (weight ratio), it becomes difficult to obtain an improving effect of the storage stability of the water-soluble copolymer aqueous solution. In addition, when the water-soluble copolymer aqueous solution is used as a detergent raw material, it becomes difficult to prevent the detergent from being colored yellow. On the other hand, when the composition ratio of the hydrogen peroxide with respect to the solid content exceeds 50,000 ppm (weight ratio), performance of a detergent tends to deteriorate when the water-soluble copolymer aqueous solution is blended in the detergent.

The composition ratio of the hydrogen peroxide with respect to the solid content of the water-soluble copolymer aqueous solution is preferably 25 ppm or more and 20,000 ppm or less, more preferably 50 ppm or more and 10,000 ppm or less, and most preferably 100 ppm or more and 5,000 ppm or less. When the composition ratio of the hydrogen peroxide with respect to the solid content of the water-soluble copolymer aqueous solution is within the above range, viscosity change of the water-soluble copolymer aqueous solution with time can also be suppressed.

The water-soluble copolymer aqueous solution of the present invention includes water as an essential component. The water-soluble copolymer aqueous solution is characterized by including 33 to 99% of water at weight ratio. The water concentration of less than 33% (weight ratio) is not preferred because viscosity of the water-soluble copolymer aqueous solution increases, resulting in difficult handling. The water concentration of 99% or more (weight ratio) is not preferred because cost upon transfer or storage increases.

In general, the residual monomer amount is preferably as small as possible. Specifically, the residual amount of the monoethylenic monocarboxylic acid (or monocarboxylate) is preferably 1,500 ppm or less, more preferably 1,000 ppm or less, and still more preferably 700 ppm or less with respect to the solid content of the water-soluble copolymer aqueous solution of the present invention. The residual amount of the monoethylenic dicarboxylic acid (dicarboxylate) is preferably 15,000 ppm or less, more preferably 10,000 ppm or less, and still more preferably 7,000 ppm or less with respect to the solid content of the water-soluble copolymer aqueous solution of the present invention. The residual amount of the monoethylenic unsaturated monomer having a sulfonic (or sulfonate) group is preferably 15,000 ppm or less, more preferably 10,000 or less, and still more preferably 7,000 ppm or less with respect to the solid content of the water-soluble copolymer aqueous solution of the present invention.

Note that the water-soluble copolymer aqueous solution of the present invention may be mixed with a compound insoluble to water before use.

In addition, poor color tone of the water-soluble copolymer aqueous solution is one of the factors which result in poor color tone of a powder containing the water-soluble copolymer aqueous solution. Accordingly, the color tone of the water-soluble copolymer aqueous solution is preferably good. Specifically, when the concentration of the water-soluble copolymer aqueous solution is adjusted to 45 weight %, b value is preferably 13 or less, more preferably 10 or less, and still more preferably 8 or less.

<<Powder Containing Water-Soluble Copolymer Aqueous Solution (Powder Composition)>>

The powder (powder composition) of the present invention is characterized in that the powder is obtained by drying the water-soluble copolymer aqueous solution of the present invention. The water-soluble copolymer aqueous solution of the present invention contains hydrogen peroxide, with the result that the powder of the present invention is characterized by having excellent color tone, that is, suppressing coloring of the powder to yellow.

The powder of the present invention has excellent color tone and calcium deposition-suppressing ability, to thereby be used preferably as a detergent additive or the like. When a 45 weight % aqueous solution is prepared by dissolving the powder of the present invention in distilled water, b value thereof is preferably 13 or less, more preferably 10 or less, and still more preferably 8 or less. The less the powder is colored when dissolved in distilled water, the less the powder itself is colored. If the b value exceeds 13 when the 45 weight % aqueous solution is prepared, the final product such as a detergent is colored to a large extent, whereby the blending amount of the powder must be equal to or less than a necessary amount.

The water-soluble copolymer aqueous solution of the present invention is generally dried under heating condition. When the aqueous solution is dried at normal pressure, the drying is performed preferably at 80 to 200° C. in view of drying efficiency. In addition, the drying is performed preferably at normal temperature or reduced pressure, and may be performed in an inert gas atmosphere such as nitrogen. The general drying means such as a drum drying or spray drying can be applied to the drying.

The powder of the present invention includes, as well as water-soluble copolymer, the residue of raw material for the copolymer such as the residual monomer, a by-product generated during the polymerization, and a by-product in which the by-product is modified in the drying process.

In addition, when it is difficult to obtain a powder-like product by drying the water-soluble copolymer aqueous solution alone due to characteristics of the water-soluble copolymer contained in the water-soluble copolymer aqueous solution, for example, characteristics of the monomer (d), the water-soluble copolymer aqueous solution can be dried in combination with an appropriate powder auxiliary. Examples of the appropriate powder auxiliary include inorganic compounds and polymers having high glass transition temperature.

In addition, the powder containing the water-soluble copolymer of the present invention may be produced by drying the water-soluble copolymer aqueous solution of the present invention in combination with another component required in the application in which the powder is used.

That is, the powder of the present invention may further include a powder auxiliary or another component required in the application in which the powder is used.

<<Agent for Suppressing Calcium Carbonate-Deposition (Deposition Inhibitor)>>

The water-soluble copolymer aqueous solution and the powder of the present invention can be used as an excellent agent for suppressing calcium carbonate-deposition.

<<Application of Water-Soluble Copolymer Aqueous Solution and Powder>>

The water-soluble copolymer aqueous solution of the present invention is characterized by having good color tone when formed into powders, that is, causing less coloring as well as having excellent clay-dispersing ability under high hardness and the calcium ion-capturing ability as described above. Accordingly, the water-soluble copolymer aqueous solution is favorably used as a raw material for a detergent composition. In addition, the water-soluble copolymer aqueous solution of the present invention has high stability, so there is a little restriction upon the production of a detergent. In addition, the water-soluble copolymer aqueous solution can provide a detergent composition to be obtained with stable quality. In addition, the water-soluble copolymer aqueous solution has high calcium carbonate deposition-suppressing ability, so deposition of calcium carbonate or the like to a product to be washed can be suppressed.

The powder of the present invention is characterized in that the powder hardly causes coloring, to thereby be favorably used as a raw material for a detergent composition. In addition, the water-soluble copolymer aqueous solution has high calcium carbonate-deposition suppressing ability, so deposition of calcium carbonate or the like to a product to be washed can be suppressed.

Next, the detergent composition is described specifically.

<Detergent Composition>

In the detergent composition of the present invention characterized by including the copolymer, the blending amount of the copolymer is 1 to 20 weight % of the total amount of the detergent composition, and the blending amount of the surfactant is preferably 5 to 70 weight % of the total amount of the detergent composition. According to cases, an enzyme may be added in the rage of 5 weight % or less. It is not preferred that the blending amount of the copolymer be less than 1 weight % because no addition effect is found. In addition, it is not preferred that the blending amount exceed 20 weight % because the addition effects do not lead to improvement of detergency any more, also resulting in disadvantage in economic efficiency. In addition, it is not preferred that the amount of the surfactant as a main agent of the detergent composition be out of the above range because the balance with another component is lost and hence detergency of the detergent composition may be adversely affected. Blending of the enzyme to the detergent composition contributes to improvement of the detergency, but it is not preferred that the blending amount exceed 5 weight % because no addition effects is found, also resulting in disadvantage in economical efficiency.

As the surfactant, at least one selected from the group consisting of an anionic surfactant, a nonionic surfactant, an amphoteric surfactant, and a cationic surfactant may be used.

Examples of the anionic surfactant include, but are not particularly limited to, alkylbenzene sulfonates, alkyl or alkenyl ether sulfonates, alkyl or alkenyl sulfonates, α-olefin sulfonates, α-sulfo fatty acids or fatty acid ester salts, alkane sulfonates, saturated or unsaturated fatty acid salts, alkyl or alkenyl ether carboxylates, amino acid-type surfactants, N-acylamino acid-type surfactants, and alkyl or alkenyl phosphates and its salts.

Examples of the nonionic surfactant include, but are not particularly limited to, polyoxyalkylene alkyl or alkenyl ethers, polyoxyethylene alkylphenyl ethers, higher fatty acid alkanol amides or its alkyleneoxide adducts, sucrose fatty acid esters, alkyl glycoxides, glycerin fatty acid monoesters, and alkylamine oxides.

Examples of the amphoteric surfactant include, but are not limited to, carboxy type amphoteric surfactants and sulfobetaine type amphoteric surfactants. Examples of the cationic surfactant include, but are not limited to, quaternary ammonium salts.

As the enzyme to be blended in the detergent composition of the present invention, a protease, a lipase, or a cellulase may be used. Specifically, a protease, an alkali lipase, and an alkali cellulase each having high activity in an alkali cleaning fluid are preferred.

Further, a component that is generally used in the detergent composition such as a known alkali builder, chelate builder, anti-redeposition agent, soil release agent, dye transfer inhibitor, softening agent, fluorescent agent, bleaching agent, bleaching auxiliary, perfume, foaming agent, antifoaming agent, antibacterial agent, corrosion inhibitor, or coloring agent may be blended in the detergent composition of the present invention. In addition, zeolite may be blended in the detergent composition.

As the alkali builder, a silicate, a carbonate, a sulfate, or the like may be used. As the chelate builder, diglycol acid, oxycarboxylate, ethylene diamine tetraacetic acid (EDTA), diethylenetriamine hexaacetic acid (DTPA), citric acid, or the like may be used as required.

The water-soluble copolymer aqueous solution of the present invention has excellent stability with time and calcium carbonate deposition-suppressing ability, to thereby be favorably used as a raw material for a liquid detergent composition. In addition, the powder containing the water-soluble copolymer of the present invention has excellent color tone and calcium carbonate deposition-suppressing ability, to thereby be favorably used as a raw material for a liquid detergent composition.

The water-soluble copolymer aqueous solution and the powder of the present invention can be favorably used as an additive for an inorganic pigment dispersant, a water treatment agent, or a fiber treatment agent. Hereinafter, those are described specifically.

<Inorganic Pigment Dispersant>

In the present invention, the inorganic pigment dispersant characterized by including the copolymer may preferably be formed of the copolymer of the present invention. Condensed phosphoric acid and a salt of the acid, phosphonic acid and a salt of the acid, or polyvinyl alcohol may be used as another compounding agent in the inorganic pigment dispersant as required.

The content of the copolymer of the present invention in the inorganic pigment dispersant of the present invention is not particularly limited and preferably 5 to 100 weight %. In addition, a known water-soluble polymer may be incorporated to such an extent that the polymer does not affect the performance and the effect of the inorganic pigment dispersant.

In any cases, the dispersant can exert good performance when used as a dispersant for an inorganic pigment such as calcium carbonate heavy or precipitated calcium carbonate, or clay, which are used in paper coating. For example, a small amount of the inorganic pigment dispersant of the present invention is added to an inorganic pigment, and the mixture is dispersed in water, whereby high-concentration inorganic pigment slurry such as high-concentration calcium carbonate slurry can be produced, the high-concentration inorganic pigment slurry having a low viscosity and high fluidity, and good stability over days of the performance of each of the dispersant and the pigment.

The use amount of the inorganic pigment dispersant of the present invention is preferably 0.05 to 2.0 parts by weight with respect to 100 parts by weight of the inorganic pigment. It is not preferred that the use amount of the inorganic pigment dispersant be less than 0.05 parts by weight because sufficient dispersing effect cannot be obtained. It is not preferred that the use amount exceed 2.0 parts by weight because the effect commensurate with the addition amount of the dispersant cannot be obtained, resulting in economical disadvantage.

<Water Treatment Agent>

In the present invention, the water treatment agent characterized by including the copolymer is preferably formed of the copolymer of the present invention and may be a composition obtained by blending a polymerized phosphate, a phosphate, an anticorrosive, a slime control agent, and a chelating agent as another compounding agent as required. In any cases, the above water treatment agent is useful in preventing scaling in, for example, a cooling water circulating system, a boiler water circulating system, a seawater desalination apparatus, a pulp digester, or a black liquor concentrating cooker. In addition, the water treatment agent may contain a known water-soluble polymer to such an extent that the polymer dose not affect the performance and the effect of the water treatment agent.

<Fiber Treatment Agent>

In the present invention, the fiber treatment agent characterized by including the copolymer contains at least one selected from the group consisting of a stain, a peroxide, and a surfactant, and the copolymer of the present invention. The content of the copolymer of the present invention in the fiber treatment agent of the present invention is not particularly limited and is preferably 1 to 100 weight % and more preferably 5 to 100 weight %. In addition, the fiber treatment agent may contain a known water-soluble polymer to such an extent that the polymer does not affect the performance and the effect of the fiber treatment agent.

A blending example of the fiber treatment agent of the present invention additionally close to an embodiment is described below. The fiber treatment agent can be used in a refining, staining, bleaching, or soaping step in a fiber treatment. Examples of each of the stain, the peroxide, and the surfactant include those generally used in fiber treatment agents.

In order that, for example, the degree of whiteness and colorfastness of a fiber may be improved, and the color unevenness of the fiber may be alleviated, a compounding ratio between the copolymer and at least one selected from the group consisting of the stain, the peroxide, and the surfactant is preferably as follows: a composition obtained by blending 1 part by weight of the copolymer of the present invention with 0.1 to 100 parts by weight of at least one selected from the group consisting of the stain, the peroxide, and the surfactant, in terms of the purity content of the fiber treatment agent, is used as the fiber treatment agent.

For example, aqueous solution of the fiber treatment agent having the compounding ratio in terms of the purity content and having a predetermined concentration is one of preferred embodiments of the fiber treatment agent of the present invention. The predetermined concentration may be determined according to usage form and intended purpose and is not particularly limited.

A fiber for which the fiber treatment agent of the present invention can be used is not particularly limited. Examples of the fiber include: cellulose-based fibers such as cotton and hemp; chemical fibers such as nylon and polyester; animal fibers such as wool and silk; semi-synthetic fibers such as artificial silk; and textile fabrics and blended yarn fabrics of those fibers.

Upon application of the above fiber treatment agent to a refining step, the copolymer of the present invention, an alkaline agent, and the surfactant are preferably blended. Upon application of the agent to a bleaching step, the copolymer of the present invention, the peroxide, and a silicic acid-based agent such as sodium silicate as a decomposition inhibitor of an alkaline bleaching agent are preferably blended.

EXAMPLES

Hereinafter, the present invention is described in detail by way of examples. However, the present invention is not limited to these examples. It should be noted that the term "%" refers to "weight %".

Measurement of the weight average molecular weight (hereinafter, referred to as Mw) of a copolymer, quantitative determination of a hydrogen peroxide, measurement of the solid content of a water-soluble copolymer aqueous solution, measurement of b value of a polymer or a water-soluble copolymer aqueous solution were performed as follows.

<Method of Measuring Weight Average Molecular Weight (Mw)>

The weight average molecular weight was measured by gel permeation chromatography (GPC).

Column; G-3000PWXL (manufactured by TOSOH CORPORATION)

Mobile phase; aqueous solution obtained by adding pure water to 34.5 g of disodium hydrogen phosphate dodecahydrate and 46.2 g of sodium dihydrogen phosphate dihydrate (both of which are special grade reagents, all reagents used for measurements below are special grade reagents) to have a total amount of 5,000 g, and then filtrating the mixture with 0.45-μm membrane filter.

Detector; UV 214 nm (manufactured by Waters Corporation, model 481-type)

Pump; L-7110 (manufactured by Hitachi, Ltd.), flow rate; 0.5 ml/min, temperature; 35° C.

Calibration curve; polyacrylic acid standard sample (manufactured by Sowakagaku)

<Measurement of Solid Content (Solid Content Concentration) of Copolymer Aqueous Solution>

The solid content of a copolymer aqueous solution (for example, reaction liquid containing the copolymer at the time when the polymerization had been terminated) was calculated by defining non-volatile matter remaining after the treatment of the reaction liquid with a hot air dryer at 170° C. for 1 hour as a solid content. That is, the solid content concentration of the copolymer aqueous solution was calculated from the following values: value obtained by weighing accurately the weight of about 1 g of the copolymer aqueous solution; and value obtained by weighing accurately the weight of the polymer after drying with above conditions.

<Method of Measuring Hydrogen Peroxide>

Analysis apparatus (reflection photometer): manufactured by Merck Ltd., RQflex (purchased from KANTO KAGAKU)

Test paper: manufactured by Merck Ltd., Reflectoquant peroxide test, 0.2 to 20.0 mg/l (purchased from KANTO KAGAKU.)

The amount of hydrogen peroxide was measured by using the above apparatus and the test paper, whereby the ratio of the peroxide to the solid content of the water-soluble copolymer aqueous solution was calculated.

Note that the range of the test paper is 0.2 to 20 ppm and hence the measurement was performed while the aqueous solution was diluted appropriately to have the concentration in the measurement range.

<Method of Measuring b Value>

The polymer or copolymer aqueous solution was adjusted to have pH of 7.5 and the solid content of 45%, whereby a sample was prepared. In the case of the copolymer aqueous solution, the aqueous solution was diluted based on the solid content concentration calculated by the above method. The b value of Lab value was measured using Spectro Color Meter SE2000 (manufactured by NIPPON DENSHOKU INDUSTRIES CO., LTD.) by transmittance measurement of the adjusted aqueous solution. The bigger positive b value means the larger yellow degree.

Example 1

Example 1 relates to a method of producing the copolymer of the present invention. Note that the weight average molecular weight (hereinafter abbreviated as Mw) of the copolymer was measured by the above-mentioned method.

Example 1-1

A water-soluble copolymer aqueous solution containing a copolymer was produced by using maleic acid (hereinafter abbreviated as MA) as a monomer (a), acrylic acid (hereinafter abbreviated as AA) as a monomer (b), and sodium 3-allyloxy-2-hydroxy-1-propanesulfonate (hereinafter abbreviated as HAPS) as a monomer (c) at a molar ratio "(a)/(b)/(c)" of 42/42/16.

That is, 64.8 g of ion-exchanged water (hereinafter referred to as "pure water"), 260 g of a 48% aqueous solution of sodium hydroxide (hereinafter abbreviated as "48% NaOH"), 196.0 g of anhydrous MA, and 331.4 g of a 25% aqueous solution of HAPS were initially loaded into an SUS316 separable flask having a volume of 2.5 L and provided with a temperature gauge, a stirring machine, and a reflux condenser, and the temperature of the solution was increased under stirring so that the solution was brought into a boiling point reflux state. Next, under stirring, 180 g of an 80% aqueous solution of AA, 40.8 g of a 35% aqueous solution of hydrogen peroxide (hereinafter abbreviated as "35% $H_2O_2$"), 331.4 g of the 25% aqueous solution of HAPS, 38.0 g of a 15% aqueous solution of sodium persulfate (hereinafter abbreviated as NaPS), 24.3 g of pure water were dropped from different dropping nozzles continuously at a uniform rate to the flask while the reflux state was maintained. The 80% aqueous solution of AA was dropped over 120 minutes from the initiation of polymerization. 35% $H_2O_2$ was dropped over 50 minutes from the initiation of the polymerization. 25% aqueous solution of HAPS was dropped over 50 minutes from the initiation of the polymerization. 15% NaPS and pure water were dropped over 80 minutes from a time point 50 minutes to 130 minutes after the initiation of the polymerization. Further, after termination of the dropping of all components, the boiling point reflux state was maintained over 30 minutes, whereby the polymerization was completed.

After termination of the polymerization, the pH and the concentration of the resultant were adjusted, whereby a water-soluble copolymer aqueous solution having a pH of 7.5 and a solid content concentration of 45% (referred to as water-soluble copolymer aqueous solution (1) and the copolymer incorporated in the aqueous solution is referred to as copolymer 1-1) was obtained. Mw of the copolymer 1-1 was 5,300.

Examples 1-2, 1-3, 1-4, and 1-5

MA as the monomer (a), AA as the monomer (b), HAPS as the monomer (c) were used, and copolymers having compositions as described in Table 1 (Example 1-2) and Table 2 (Examples 1-3, 1-4, and 1-5) were synthesized in the same manner as in Example 1-1.

That is, the polymerization reaction was performed in the same manner as in Example 1-1 except that the reaction furnaces, monomer compositions, initially loaded amounts, dropping amounts, dropping time, aging time were as described in Table 1 or Table 2.

After termination of the polymerization, copolymers 1-2, 1-3, 1-4, and 1-5, in each of which the pH was adjusted to 7.5 and the solid content concentration was adjusted to 45% as in Example 1-1, were obtained. Mw's of copolymers were 5,300, 6,500, 15,300, 8,400, and 7,600, respectively (the obtained water-soluble copolymer aqueous solutions were referred to as water-soluble copolymer aqueous solution (2), water-soluble copolymer aqueous solution (3), water-soluble copolymer aqueous solution (4), water-soluble copolymer aqueous solution (5), respectively, and the copolymers incorporated in each of the water-soluble copolymer aqueous solutions were referred to as copolymer 1-2, copolymer 1-3, copolymer 1-4, and copolymer 1-5.)

TABLE 1

|  | (Unit) | Example 1-1 Water-soluble copolymer aqueous solution (1) | Example 1-2 Water-soluble copolymer aqueous solution (2) |
|---|---|---|---|
| a/b/c (Molar ratio) |  | 42/42/16 | 42/42/16 |
| Initial loading |  |  |  |
| Pure water | (g) | 64.8 | 64.8 |
| 48% NaOHaq | (g) | 260 | 260 |
|  | (mol) | 3.1 | 3.1 |
| Anhydrous MA | (g) | 196.0 | 196.0 |
|  | (mol) | 2.0 | 2.0 |
| 25% HAPS | (g) | 331.4 | 331.4 |
|  | (mol) | 0.38 | 0.38 |
| Dropping |  |  |  |
| 80% AAaq | (g) | 180 | 180 |
|  | (mol) | 2.0 | 2.0 |
| 35% $H_2O_2$aq(1) | (g) | 40.8 | 40.8 |
|  | (g/mol) | 3.0 | 3.0 |
| 15% NaPSaq | (g) | 38.0 | 38.0 |
|  | (g/mol) | 1.2 | 1.2 |
| 25% HAPSaq | (g) | 331.4 | 331.4 |
|  | (mol) | 0.38 | 0.38 |
| Pure water | (g) | 24.3 | 24.3 |
| Dropping after neutralization |  |  |  |
| 35% $H_2O_2$aq | (g) | 0 | 4.50 |
| Dropping time | (min) |  |  |
| 80% AAaq |  | 0-120 | 0-120 |
| 35% $H_2O_2$aq |  | 0-50 | 0-50 |
| 15% NaPSaq |  | 50-130 | 50-130 |
| 25% HAPSaq |  | 0-50 | 0-50 |
| Pure water |  | 50-130 | 50-130 |
| Polymerization/aging temperature | (° C.) | Boiling point | Boiling point |
| Aging time | (min) | 30 | 30 |
| Reaction furnace |  | 2.5-L SUS316 furnace | 2.5-L SUS304 furnace |
| Mw |  | 5,300 | 6,500 |
| b value of pH 7.5/45% aqueous solution |  | 5.0 | 1.1 |
| Residual $H_2O_2$ (in terms of solid content) | (ppm) | 100 | 1060 |

TABLE 2

|  |  | Example 1-3 Water-soluble copolymer aqueous solution (3) | Example 1-4 Water-soluble copolymer aqueous solution (4) | Example 1-5 Water-soluble copolymer aqueous solution (5) |
|---|---|---|---|---|
| a/b/c (Molar ratio) |  | 46/46/8 | 45/45/10 | 45/45/12 |
| Initial loading | (Unit) |  |  |  |
| Pure water | (g) | 440.6 | 440.6 | 440.6 |
| 48% NaOHaq | (g) | 568.7 | 568.7 | 568.7 |
|  | (mol) | 6.82 | 6.82 | 6.82 |

TABLE 2-continued

|  | (Unit) | Example 1-3 Water-soluble copolymer aqueous solution (3) | Example 1-4 Water-soluble copolymer aqueous solution (4) | Example 1-5 Water-soluble copolymer aqueous solution (5) |
|---|---|---|---|---|
| a/b/c (Molar ratio) |  | 46/46/8 | 45/45/10 | 45/45/12 |
| Anhydrous MA | (g) | 462.8 | 452.5 | 442.6 |
|  | (mol) | 4.72 | 4.62 | 4.51 |
| 40% HAPS | (g) | 447.3 | 559.3 | 670.9 |
|  | (mol) | 0.82 | 1.03 | 1.23 |
| Dropping |  |  |  |  |
| 80% AAaq | (g) | 424.7 | 415.6 | 406.3 |
|  | (mol) | 4.72 | 4.62 | 4.51 |
| 35% $H_2O_2$aq | (g) | 44.0 | 58.6 | 58.6 |
|  | (g/mol) | 1.5 | 2.0 | 2.0 |
| 15% NaPSaq | (g) | 102.6 | 164.1 | 136.8 |
|  | (g/mol) | 1.5 | 2.4 | 2.0 |
| 40% HAPSaq | (g) | 0 | 0 | 0 |
|  | (mol) | 0 | 0 | 0 |
| Pure water | (g) | 221.7 | 157.9 | 158.7 |
| Dropping time | (min) |  |  |  |
| 80% AAaq |  | 0-120 | 0-120 | 0-120 |
| 35% $H_2O_2$aq |  | 0-75 | 0-75 | 0-75 |
| 15% NaPSaq |  | 0-130 | 0-130 | 0-130 |
| 40% HAPSaq |  | — | — | — |
| Pure water |  | 75-130 | 75-130 | 75-130 |
| Polymerization/aging temperature | (° C.) | Boiling point | Boiling point | Boiling point |
| Aging time | (min) | 30 | 30 | 30 |
| Reaction furnace |  | 5-L SUS316 furnace | 5-L SUS316 furnace | 5-L SUS316 furnace |
| Mw |  | 15,300 | 8,400 | 7,600 |
| b value of pH 7.5/45% aqueous solution |  | 1.2 | 0.8 | 2.2 |
| Residual $H_2O_2$ (interms of solid content) | (ppm) | 400 | 530 | 600 |

Comparative Examples 1-1 and 1-2

A comparative water-soluble copolymer aqueous solution (1) and a comparative water-soluble copolymer aqueous solution (2) (copolymers incorporated were referred to as comparative copolymer (1) and comparative copolymer (2), respectively) were obtained in the same manner as in Example 1-1 except that the reaction furnaces, monomer compositions, initially loaded amounts, dropping amounts, dropping time, aging time were as described in Table 3.

TABLE 3

|  | (Unit) | Comparative Example 1-1 Comparative water-soluble copolymer aqueous solution (1) | Comparative Example 1-2 Comparative water-soluble copolymer aqueous solution (2) |
|---|---|---|---|
| a/b/c (Molar ratio) |  | 42/42/16 | 42/42/16 |
| Initial loading |  |  |  |
| Pure water | (g) | 64.8 | 64.8 |
| 48% NaOHaq | (g) | 260 | 260 |
|  | (mol) | 3.1 | 3.1 |
| Anhydrous MA | (g) | 196.0 | 196.0 |
|  | (mol) | 2.0 | 2.0 |
| 25% HAPS | (g) | 331.4 | 331.4 |
|  | (mol) | 0.38 | 0.38 |
| Dropping |  |  |  |
| 80% AAaq | (g) | 180 | 180 |
|  | (mol) | 2.0 | 2.0 |
| 35% $H_2O_2$aq | (g) | 40.8 | 40.8 |
|  | (g/mol) | 3.0 | 3.0 |
| 15% NaPSaq | (g) | 38.0 | 38.0 |
|  | (g/mol) | 1.2 | 1.2 |
| 25% HAPSaq | (g) | 331.4 | 331.4 |
|  | (mol) | 0.38 | 0.38 |
| Pure water | (g) | 24.3 | 24.3 |
| Dropping time | (min) |  |  |
| 80% AAaq |  | 0-120 | 0-120 |
| 35% $H_2O_2$aq |  | 0-50 | 0-30 |
| 15% NaPSaq |  | 50-130 | 50-130 |
| 25% HAPSaq |  | 0-50 | 0-50 |
| Pure water |  | 50-130 | 50-130 |
| Polymerization/aging temperature |  | Boiling point | Boiling point |
| Aging time | (min) | 30 | 30 |
| Reaction furnace |  | 2.5-L SUS304 furnace | 2.5-L SUS316 furnace |
| Mw |  | 6,500 | 5,900 |
| b value of pH 7.5/45% aqueous solution |  | 13.2 | 14.1 |
| Residual $H_2O_2$ (in terms of solid content) | (ppm) | 0 | 0 |

Example 2

Color Tone Test Upon Drying

The water-soluble copolymer aqueous solutions (1) to (5) of the present invention and comparative water-soluble copolymer aqueous solutions (1) and (2) were each collected in each of glass petri dishes, and incubated in an oven at 110° C. for 3 hours to remove moisture, whereby powders of the present invention and comparative powders were obtained. The powders were each dissolved in distilled water and thus aqueous solutions each having the solid content concentration of 45 weight % were prepared. By the above method, results of evaluations for b values of the aqueous solutions based on the following criteria are shown in Table 4.

++: The b value when an aqueous solution is prepared is 10 or less.

+: The b value when an aqueous solution is prepared is more than 10 and 13 or less.

−: The b value when an aqueous solution is prepared is more than 13.

<Calcium-Deposition Prevention Test>

(1) First, a 1.56% aqueous solution of calcium chloride dihydrate, a 3% aqueous solution of sodium hydrogen carbonate, and a 0.02% copolymer aqueous solution were prepared.

(2) Next, 170 g of pure water were put in a glass bottle having the volume of 225 ml, 10 g of the 1.56% aqueous solution of calcium chloride dihydrate, 3 g of the 0.02% copolymer aqueous solution, 10 g of the aqueous solution of sodium hydrogen carbonate, and 7 g of sodium chloride were added to the glass bottle to have the total amount of 200 g.

(3) The obtained 530 ppm supersaturated aqueous solution of calcium carbonate was sealed and then subjected to heat treatment at 70° C.

(4) After cooling, the precipitate was filtered with a 0.1-μm membrane filter, and the filtrate was analyzed according to JIS K0101.

(5) From the above measurement results, the calcium carbonate-deposition prevention ratio (%) was determined by the following equation:

$$\text{Scale suppression ratio (\%)} = [(C-B)/(A-B)] \times 100;$$

provided that:

A: concentration (%) of calcium dissolved in the liquid before the test.

B: concentration (%) of calcium in the liquid without adding a copolymer.

C: concentration (%) of calcium in the filtrate after the test.

Example 3

Each of the water-soluble copolymer aqueous solutions (1) to (5) of the present invention and comparative water-soluble copolymer aqueous solutions (1) and (2) was collected in a predetermined amount and evaluated for calcium-deposition preventing ability. Results are shown in Table 4.

TABLE 4

|  | Color tone | Calcium-deposition preventing ability |
|---|---|---|
| Water-soluble copolymer aqueous solution (1) | ++ | 74 |
| Water-soluble copolymer aqueous solution (2) | ++ | 74 |
| Water-soluble copolymer aqueous solution (3) | ++ | 72 |
| Water-soluble copolymer aqueous solution (4) | ++ | 73 |
| Water-soluble copolymer aqueous solution (5) | ++ | 72 |
| Comparative water-soluble copolymer aqueous solution (1) | − | 74 |
| Comparative water-soluble copolymer aqueous solution (2) | − | 71 |

From the results in Table 4, it has been revealed that the copolymer aqueous solutions (containing hydrogen peroxide) of the present invention remarkably improve color tone upon drying while high calcium carbonate-deposition preventing ability is maintained, compared to comparative copolymer aqueous solutions each having a copolymer similar to that of the copolymer aqueous solution.

INDUSTRIAL APPLICABILITY

The copolymer composition of the present invention can be favorably used in a detergent composition.

The invention claimed is:

1. A water-soluble copolymer aqueous solution, comprising a water-soluble copolymer and hydrogen peroxide as essential components, wherein:
    the water-soluble copolymer at least compromises, as its structure, maleic acid, maleate, maleic anhydride or mixtures thereof (a) at 30 to 70 mol %, a acrylic acid, acrylate, methacrylic acid methacrylate or mixtures thereof (b) at 30 to 70 mol %, and a structural unit originating from 3-allyloxy-2-hydroxy-1-propanesulfonic acid (c) at 2 to 16 mol %, a structural unit originating from another monomer (d) at 0 to 5 mol % and the total mol % of (a) to (d) is 100 mol %;
    the water-soluble copolymer has a weight average molecular weight of 1,000 to 50,000;
    the water-soluble copolymer aqueous solution has a weight ratio of the hydrogen peroxide of 10 ppm to 50,000 ppm with respect to a solid content of the water-soluble copolymer aqueous solution; and
    the water-soluble copolymer aqueous solution has a weight ratio of water of 33% to 99%.

2. A water-soluble copolymer aqueous solution according to claim 1, wherein 50 to 100 mol % of (a) is maleic acid.

* * * * *

UNITED STATES PATENT AND TRADEMARK OFFICE
CERTIFICATE OF CORRECTION

PATENT NO.      : 9,133,422 B2
APPLICATION NO. : 12/863865
DATED           : September 15, 2015
INVENTOR(S)     : Takahiro Tsumori Page 1 of 1

It is certified that error appears in the above-identified patent and that said Letters Patent is hereby corrected as shown below:

In the Claims:

Column 27

Claim 1, line 32, please replace "compromises" with -- comprises --

Claim 1, line 34, please replace "a acrylic acid" with -- acrylic acid --

Claim 1, line 41, please add -- from -- between "of" and "1,000"

Signed and Sealed this
Eighth Day of March, 2016

Michelle K. Lee
*Director of the United States Patent and Trademark Office*